(12) United States Patent
Williamson

(10) Patent No.: US 12,226,007 B2
(45) Date of Patent: Feb. 18, 2025

(54) DETACHABLE SHOPPING CART HANDLE DEVICE

(71) Applicant: Paul L. Williamson, Aurora, CO (US)

(72) Inventor: Paul L. Williamson, Aurora, CO (US)

( * ) Notice: Subject to any disclaimer, the term of this patent is extended or adjusted under 35 U.S.C. 154(b) by 861 days.

(21) Appl. No.: 17/313,446

(22) Filed: May 6, 2021

(65) Prior Publication Data
US 2021/0347399 A1 Nov. 11, 2021

Related U.S. Application Data

(60) Provisional application No. 63/020,774, filed on May 6, 2020.

(51) Int. Cl.
*A45F 5/10* (2006.01)
*B62B 5/06* (2006.01)

(52) U.S. Cl.
CPC .............. *A45F 5/102* (2013.01); *B62B 5/06* (2013.01); *B62B 5/067* (2013.01); *B62B 5/069* (2013.01); *A45F 2005/1006* (2013.01)

(58) Field of Classification Search
CPC .......... B62B 5/06; B62B 5/067; B62B 5/069; B62B 9/20; B62B 9/203; B62B 9/206; B25G 3/12; B25G 3/20; B25G 3/26; A45F 5/10; A45F 5/102; A45F 5/1026; A45F 2005/1006; A45F 2005/1013; A45F 2005/1066; A45F 2005/1073; A45F 2005/1033; A45F 2005/104; A45F 2005/1046; A45F 2005/1053; A45F 2005/106; A01B 1/026; B62K 21/125

USPC ....... 280/304.5; 16/904, 422, 425, 426, 427, 16/406; D34/27; 220/752, 755, 757, 220/758, 759, 760
See application file for complete search history.

(56) References Cited

U.S. PATENT DOCUMENTS

| 150,627 | A | * | 5/1874 | Stevens | A45F 5/10 |
| | | | | | 294/157 |
| 359,241 | A | * | 3/1887 | Case | B65D 25/32 |
| | | | | | 294/170 |
| 539,690 | A | * | 5/1895 | Lasher, Jr. | B65G 7/12 |
| | | | | | 294/27.1 |
| 587,626 | A | * | 8/1897 | Vollmer | B62K 21/125 |
| | | | | | 74/551.9 |
| 758,482 | A | * | 4/1904 | Smith | B25G 3/32 |
| | | | | | 294/58 |

(Continued)

FOREIGN PATENT DOCUMENTS

| DE | 202009017579 U1 * | 5/2010 | ............... B62B 5/06 |
| DE | 102012204007 A1 * | 10/2013 | ............. B62B 5/069 |

(Continued)

*Primary Examiner* — Jeffrey O'Brien
(74) *Attorney, Agent, or Firm* — Macheledt Bales LLP; Jennifer L. Bales

(57) ABSTRACT

A detachable shopping handle device includes a handgrip, an arm and a clamp for gripping shopping cart handles. The clamp may be sized and configured to snap onto the handle or the clamp may open to fit over the handle and close to grip it. The device arm may telescope or fold. The device may include two spaced-apart clamps. The clamp may be detachable from the arm. The arm may include a hook for carrying a shopping bag. The device may include a rechargeable battery and a connection for charging a phone. A carrying case may be used to hold the device.

3 Claims, 7 Drawing Sheets

(56) References Cited

U.S. PATENT DOCUMENTS

| | | | | |
|---|---|---|---|---|
| 1,243,565 A * | 10/1917 | Smith | B65G 7/12 294/158 |
| 1,503,348 A * | 7/1924 | Bruhn | B62D 1/043 74/557 |
| 1,967,560 A * | 7/1934 | Oberg | A45F 5/1026 294/169 |
| 2,029,809 A * | 2/1936 | Connolly | A45F 5/10 294/28 |
| 2,803,849 A * | 8/1957 | Peters | B62B 5/06 D34/27 |
| 2,873,995 A * | 2/1959 | Turner | B65G 7/12 D8/71 |
| 2,997,326 A * | 8/1961 | Daum | A01K 55/00 294/118 |
| 3,335,828 A * | 8/1967 | Simms | A45C 13/22 294/170 |
| 3,414,909 A * | 12/1968 | Provi | A47K 3/003 4/577.1 |
| 3,414,910 A * | 12/1968 | Provi | A47K 3/003 4/577.1 |
| 3,591,063 A * | 7/1971 | Pearce | B63B 32/87 294/137 |
| D236,410 S * | 8/1975 | Jenkins et al. | D7/622 |
| 4,004,722 A * | 1/1977 | Olivier | A45F 5/1026 D9/434 |
| 4,120,073 A * | 10/1978 | Studebaker | A47G 23/0266 D7/622 |
| 4,478,450 A * | 10/1984 | Picozza | A45F 5/10 220/759 |
| 4,723,801 A * | 2/1988 | Musumeci | A61J 9/0623 D7/622 |
| D298,077 S * | 10/1988 | Goodwin | B62B 5/069 D34/27 |
| 4,794,667 A * | 1/1989 | Nelson | B25G 1/00 294/58 |
| 4,807,916 A * | 2/1989 | Erickson | B62B 5/06 294/27.1 |
| 4,955,914 A * | 9/1990 | Caniglia | A61J 17/113 606/235 |
| 5,297,445 A * | 3/1994 | Chen | B62K 21/125 74/551.8 |
| 5,319,994 A * | 6/1994 | Miller | B62K 21/125 280/281.1 |
| 5,319,995 A * | 6/1994 | Huang | B62K 21/125 74/551.8 |
| 5,323,511 A * | 6/1994 | Gray | B60N 3/026 16/110.1 |
| 5,425,285 A * | 6/1995 | Cheng | B62K 21/125 74/551.8 |
| 5,429,013 A * | 7/1995 | Taylor | B62K 21/125 74/551.8 |
| 5,429,377 A * | 7/1995 | Duer | B62B 5/06 150/154 |
| D362,100 S * | 9/1995 | McMurdo | D34/27 |
| 5,451,085 A * | 9/1995 | Wagner | A01B 1/22 294/58 |
| 5,469,986 A * | 11/1995 | Jang | B65D 21/062 220/772 |
| 5,695,231 A * | 12/1997 | Hoffman | B25G 3/20 294/58 |
| 5,794,307 A * | 8/1998 | Overcash | B62B 1/18 16/427 |
| 5,809,614 A * | 9/1998 | Kretser, Jr. | A01D 34/902 16/422 |
| 5,873,147 A * | 2/1999 | Hintz | B62B 5/06 280/DIG. 6 |
| 5,954,379 A * | 9/1999 | Pikel | A63B 71/0036 294/166 |
| 6,003,405 A * | 12/1999 | Giard | B62K 21/125 74/551.8 |
| 6,029,874 A * | 2/2000 | Meggitt | B62J 9/21 224/919 |
| 6,317,924 B1 * | 11/2001 | Gallagher | A45C 13/26 16/113.1 |
| 6,441,974 B1 * | 8/2002 | Miranda | G02B 25/002 359/809 |
| 6,575,513 B2 * | 6/2003 | Pikel | A45F 5/10 294/166 |
| 6,601,887 B2 * | 8/2003 | Graves | A01B 1/026 294/58 |
| 6,868,584 B2 * | 3/2005 | Trottier | B62K 11/14 280/304.5 |
| 6,880,852 B2 * | 4/2005 | Lim | B62B 1/20 280/47.2 |
| 7,657,972 B2 * | 2/2010 | Jenkins | B25G 1/06 16/108 |
| 7,866,004 B1 * | 1/2011 | Hermann | B62B 5/06 16/110.1 |
| D635,733 S * | 4/2011 | Willig | B62B 5/069 D34/27 |
| 8,312,598 B2 * | 11/2012 | Palmer | B62B 1/202 16/422 |
| 8,381,358 B1 * | 2/2013 | Frey | B25G 1/06 16/444 |
| 8,540,294 B2 * | 9/2013 | Dowler | B65G 7/12 294/148 |
| D697,766 S * | 1/2014 | Smith | D7/622 |
| 8,671,523 B1 * | 3/2014 | Day | A45F 5/10 16/422 |
| 8,695,167 B2 * | 4/2014 | Mizuguchi | F16B 2/10 16/422 |
| 8,714,215 B2 * | 5/2014 | Badgley | E05B 1/0069 224/411 |
| 8,714,570 B2 * | 5/2014 | Skijus | B62B 5/067 16/422 |
| 8,844,948 B1 * | 9/2014 | Tanner | B62B 5/067 135/66 |
| 8,851,234 B2 * | 10/2014 | Bachorski | E06C 7/00 294/166 |
| 8,893,355 B2 * | 11/2014 | Longley | B25G 1/00 294/58 |
| 8,905,262 B2 * | 12/2014 | Shull | B65D 51/007 220/741 |
| 9,144,708 B2 * | 9/2015 | Selek | B62B 5/062 |
| 9,545,937 B2 * | 1/2017 | Morcillo Barjola | B62B 5/067 |
| 9,844,213 B1 * | 12/2017 | Olsen | B25G 3/20 |
| 10,258,705 B2 * | 4/2019 | Bord | A61L 2/18 |
| 10,654,507 B2 * | 5/2020 | Perilli | B62B 5/067 |
| 10,737,924 B1 * | 8/2020 | Crowell | B66F 19/005 |
| 10,752,277 B2 * | 8/2020 | Haigh | B62B 5/064 |
| 11,207,771 B2 * | 12/2021 | Currier, III | A61L 2/10 |
| 11,357,316 B2 * | 6/2022 | King | B65D 63/18 |
| 11,794,329 B1 * | 10/2023 | Pladson | A01B 1/026 |
| 2003/0039037 A1 * | 2/2003 | Miranda | G02B 25/002 359/811 |
| 2003/0057721 A1 * | 3/2003 | Ducklow | B25G 1/00 294/58 |
| 2007/0267828 A1 * | 11/2007 | Egizi | B62B 5/069 280/33.992 |
| 2007/0296233 A1 * | 12/2007 | Eichenbaum | A45F 5/1026 294/158 |
| 2009/0111661 A1 * | 4/2009 | Hauser | A63B 23/1209 482/40 |
| 2010/0186545 A1 * | 7/2010 | Ray | B62K 21/125 74/551.8 |
| 2011/0173778 A1 * | 7/2011 | Wales | B25G 3/20 16/426 |
| 2012/0148783 A1 * | 6/2012 | Kunkleman | B62B 5/069 428/43 |
| 2012/0192540 A1 * | 8/2012 | Macyszyn | A01D 7/00 56/400.01 |
| 2012/0222269 A1 * | 9/2012 | Anderson | B60N 3/026 16/422 |
| 2014/0024506 A1 * | 1/2014 | Vixathep | A63B 21/0726 482/108 |
| 2014/0300079 A1 * | 10/2014 | Rhodes | A61G 5/06 280/304.1 |

(56) References Cited

U.S. PATENT DOCUMENTS

| | | | |
|---|---|---|---|
| 2015/0183451 A1* | 7/2015 | Stierli | B62B 9/206 |
| | | | 16/421 |
| 2015/0197306 A1* | 7/2015 | Denby | B62K 21/26 |
| | | | 74/551.9 |
| 2015/0216099 A1* | 8/2015 | Hanson | E01H 5/02 |
| | | | 294/58 |
| 2016/0121476 A1* | 5/2016 | Techlin | A01K 87/085 |
| | | | 16/426 |
| 2016/0159426 A1* | 6/2016 | Malaj | B62K 21/145 |
| | | | 74/551.1 |
| 2017/0113709 A1* | 4/2017 | Mason | B62B 1/20 |
| 2018/0140890 A1* | 5/2018 | Sheppard | A63B 21/0728 |
| 2019/0344423 A1* | 11/2019 | Doherty | B25G 1/102 |
| 2020/0276999 A1* | 9/2020 | Fanelli | B62B 9/20 |
| 2020/0398883 A1* | 12/2020 | Sisson | E05B 1/0069 |
| 2021/0394808 A1* | 12/2021 | Trask | B62B 5/069 |
| 2022/0119028 A1* | 4/2022 | Hopkins | B62B 3/1472 |
| 2022/0204272 A1* | 6/2022 | McCall | B65G 7/12 |
| 2022/0257999 A1* | 8/2022 | Gu | B62J 11/04 |
| 2022/0289264 A1* | 9/2022 | Partsch, IV | B62B 5/069 |
| 2022/0348245 A1* | 11/2022 | Kitt | A61L 2/238 |
| 2022/0379944 A1* | 12/2022 | Bernal | B62B 5/069 |
| 2024/0059340 A1* | 2/2024 | Rolling-Smith | B62B 5/069 |

FOREIGN PATENT DOCUMENTS

| | | | |
|---|---|---|---|
| DE | 202020001761 U1 * | 8/2020 | |
| DE | 202020001937 U1 * | 8/2020 | |
| DE | 202020002557 U1 * | 9/2020 | |

\* cited by examiner

DETACHABLE SHOPPING CART HANDLE DEVICE

BACKGROUND OF THE INVENTION

Field of the Invention

The present invention relates to a detachable shopping cart handle device.

Discussion of Related Art

Currently, shopping is an activity that exposes a shopper to bacteria and viruses in a number of ways. One way is by touching a shopping cart handle or the handles of a shopping basket after a sick person has touched them. While grocery store workers may sanitize carts before new customers use them, germs may be missed.

A need remains in the art for a detachable shopping handle device which may be attached to the handle of the shopping cart by the shopper, so the shopper does not need to touch the shopping cart handle at all.

SUMMARY OF THE INVENTION

The present invention provides detachable shopping handle devices. Such devices include handgrips, arms and clamps for gripping shopping cart handles. The clamp may be sized and configured to snap onto the handle or a trigger mechanism may be used to open and close the clamp. The device arm may telescope or fold. The device may include two spaced-apart clamps. The clamp may be detachable from the arm. The arm may include a hook for carrying a shopping bag. The arm may include a battery and a connection for charging a phone. A carrying case may be used to hold the device.

A detachable shopping handle device includes a handgrip configured to allow a user to grip the device, a clamp configured to detachably clamp onto a shopping handle of a shopping receptacle, and an arm disposed between the handgrip and the clamp and attached to the handgrip and the clamp. The shopping handle device clamp is configured to attach to the shopping handle firmly enough to allow the user to guide the shopping receptacle.

When the shopping receptacle is a wheeled shopping cart, the device clamp attaches to the shopping cart handle firmly enough to allow the user to impel the shopping cart to roll and to steer the shopping cart. When the shopping receptacle is a shopping basket, the device clamp attaches to the basket handle(s) handle firmly enough to allow the user to lift and carry the shopping basket when the shopping basket contains a significant amount of groceries, for example up to 20 pounds.

The clamp may snap firmly onto the shopping handle, or it may open and close to go over the handle and then clamp down onto it. If the clamp opens and closes, it is useful to have a triggered locking mechanism that keeps the clamp from opening while in use.

It is also useful to have the clamp be biased to close (by a spring or the like) so that the user uses pressure to open the clamp, but it closes on its own. The pressure may be applied to the appendages of the clamp itself, or a mechanism may be provided on the handgrip or the arm to open/close the clamp appendages. Grabber tools and trash pickers use a number of different mechanisms to open their grabbing ends, including pushing a button or squeezing a trigger grip, which may be adapted to this shopping handle device.

Shopping handle devices may include other features such as additional handgrips or clamps. The device arm may telescope longer and shorter or may fold for storage. Again, locking mechanisms to keep the device telescoped length fixed, or to keep the device folded or unfolded are useful. The arm may be detachable from the clamp. The handgrip may include a rechargeable battery and a connector element to permit the battery to be recharged and to charge a device from the battery. The arm may include a hook for grocery bags and the like, which may fold out of the way when not in use.

DETAILED DESCRIPTION OF THE INVENTION

TABLE 1

| Reference Number | Element |
|---|---|
| 100, 300, 600, 800, 900 | Detachable shopping handle device |
| 102, 302, 602, 902, 1102 | Handgrip |
| 104, 304, 604, 904 | Arm |
| 106, 306, 606, 806, 906, 1106 | Clamp |
| 112, 312, 612 | Gripping appendages |
| 400 | Cart |
| 402 | Cart handle |
| 500 | Shopping basket |
| 502 | Shopping basket handle(s) |
| 608, 808 | Clamp hinge |
| 614 | Trigger mechanism |
| 800 | Device with hook |

TABLE 1-continued

| Reference Number | Element |
|---|---|
| 814 | Opening and closing mechanism |
| 818 | Hook |
| 830 | Grocery bag |
| 900 | Foldable device |
| 920 | Pivot joint |
| 1000 | Storage unit |
| 1150 | Handle attachment point |
| 1152 | Clamp attachment point |
| 1202 | Battery |
| 1204 | Connector element |
| 1206 | Battery recharging connection |
| 1208 | Device charging connection |

Table 1 shows elements of the present invention and their associated reference numbers.

Figure 1:
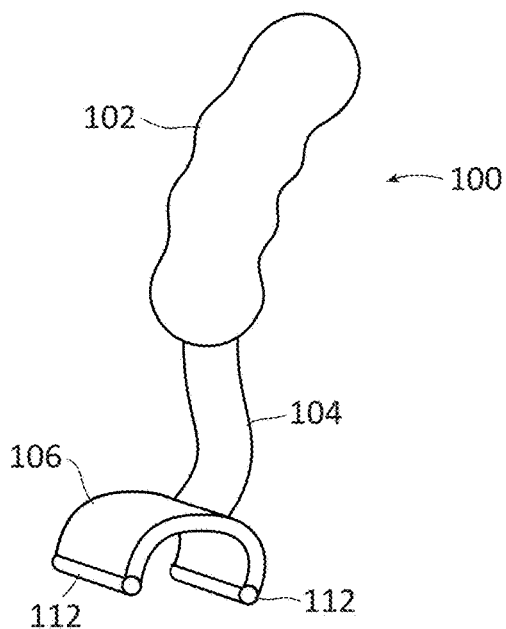
FIG. 1 is an isometric drawing of a first embodiment of a detachable shopping handle device according to the present invention.
Figure 2:
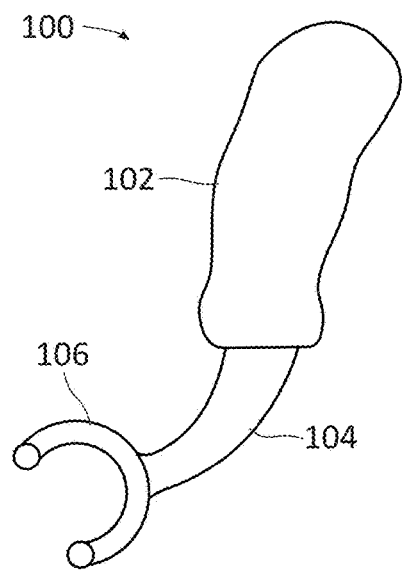
FIG. 2 is side view drawing of the detachable shopping handle of FIG. 1.
Figure 4:
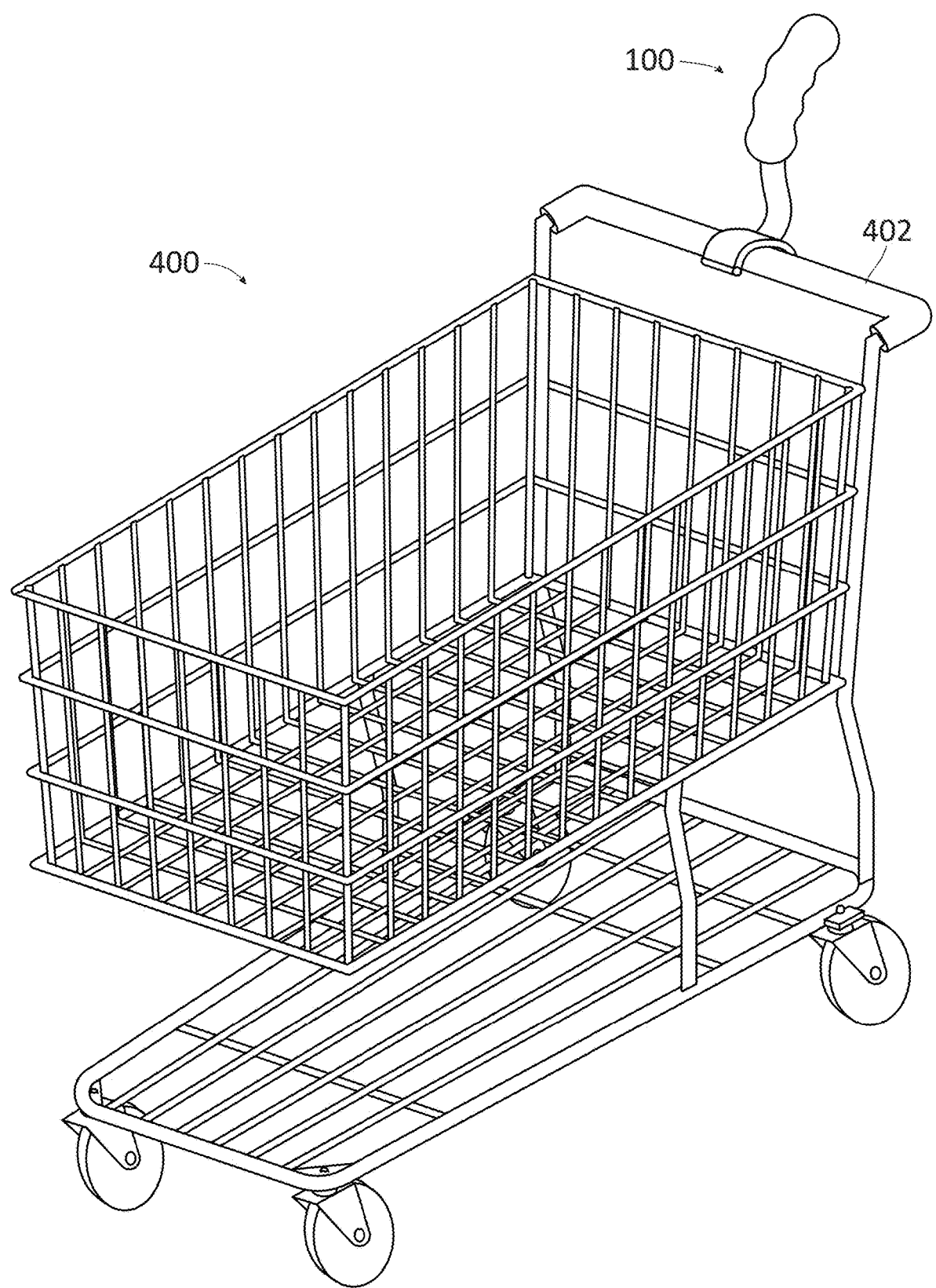
FIG. 4 is an isometric view of the embodiment of FIGS. 1 and 2 attached to the handle of a shopping cart.

FIG. 1 is an isometric drawing of detachable shopping handle device 100. FIG. 2 is side view drawing of device 100. Device 100 comprises a handgrip 102, an arm 104, and a clamp 106 configured to snap onto the handle 402 of a shopping cart 400 or handles 502 of a shopping basket 500 (see FIGS. 4 and 5). Clamp 106 has gripping appendages 112 which are, for example, sized and configured to snap onto a standard shopping cart handle 402 as shown in FIG. 4. Two devices 100 may be used, disposed apart on handle 402.

Figure 3:
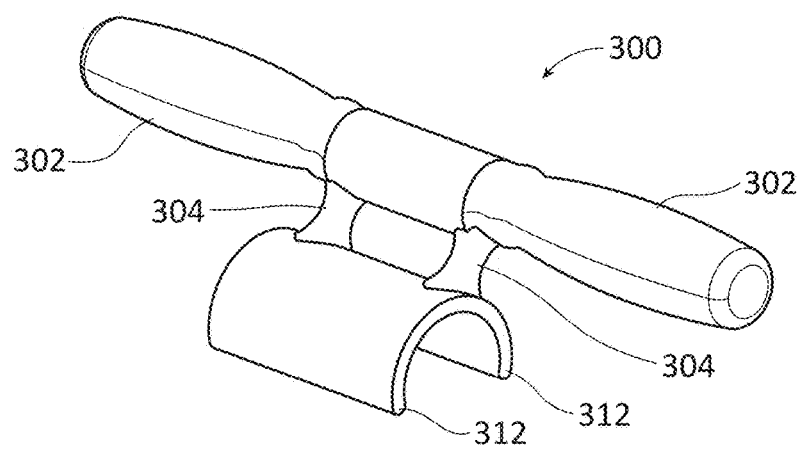
FIG. 3 is an isometric drawing of a second embodiment of a detachable shopping handle device according to the present invention, with dual handles.

FIG. 3 is an isometric drawing of detachable shopping handle device 300. Handle 300 is similar to handle 100, except that it includes dual handgrips 302. This embodiment has the advantage of being easier steer shopping cart 400 with. Again, gripping appendages 312 of clamp 306 are sized and configured to snap onto a shopping cart 400 handle 402 or shopping basket 500 handles 502. Arms 304 are shorter than arm 104 in this embodiment.

Figure 5:
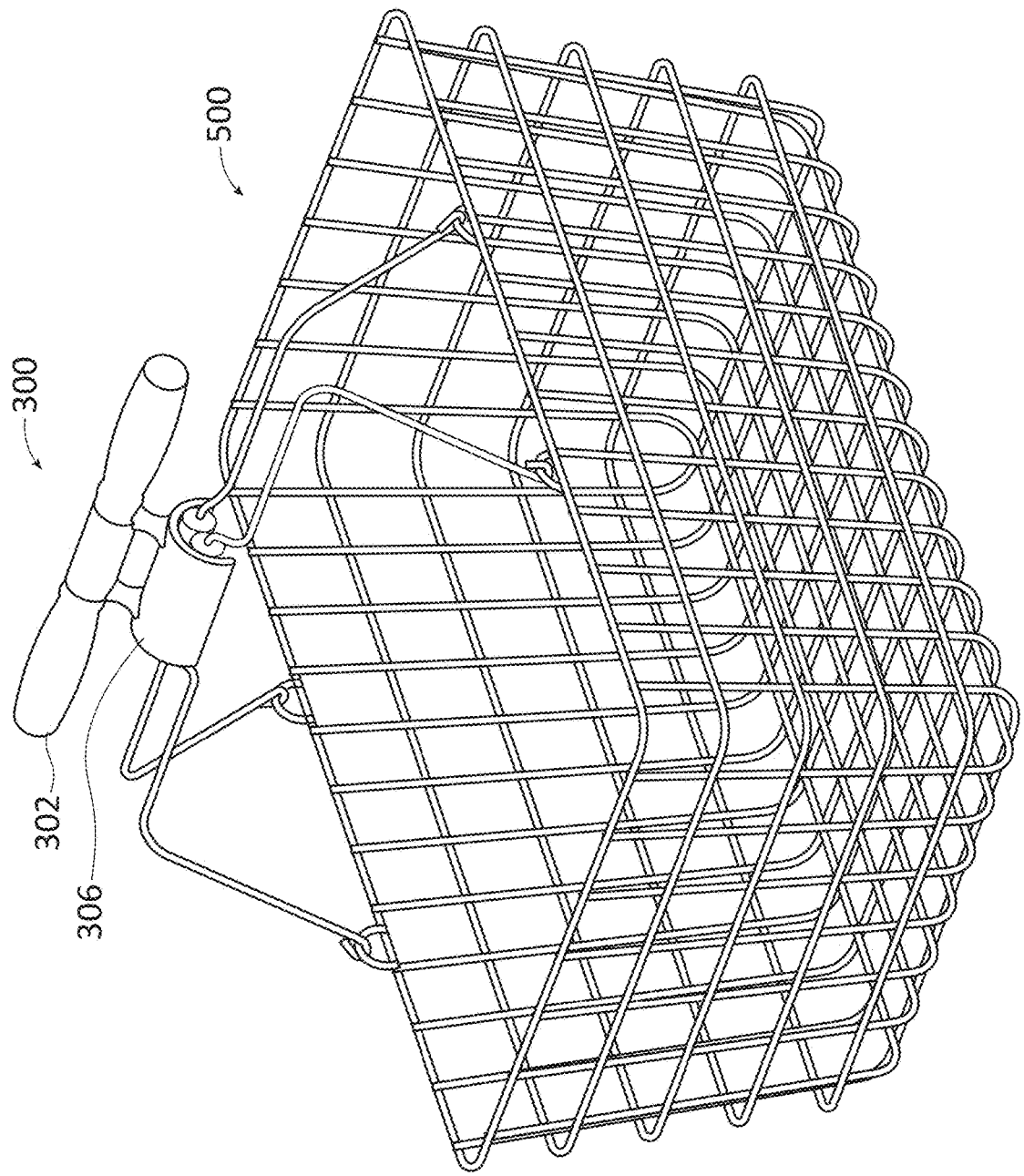
FIG. 5 is an isometric view of the embodiment of FIG. 3 attached to the handle of a shopping basket.

FIG. 4 is an isometric view of detachable shopping handle device 100 attached to the handle 402 of a shopping cart 400. FIG. 5 is an isometric view of detachable shopping handle device 300 attached to the handles 502 of a shopping basket 500. Various other types of clamps could be used in the place of clamps 206, 306. Some examples are shown in the following figures.

Figure 6:
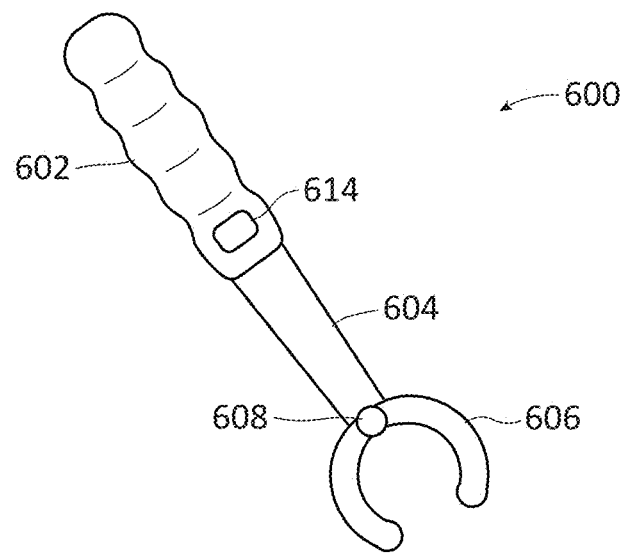
FIG. 6 is an isometric drawing of a third embodiment of detachable shopping handle device according to the present invention, having an extendable arm and a trigger clamp.
Figure 7:
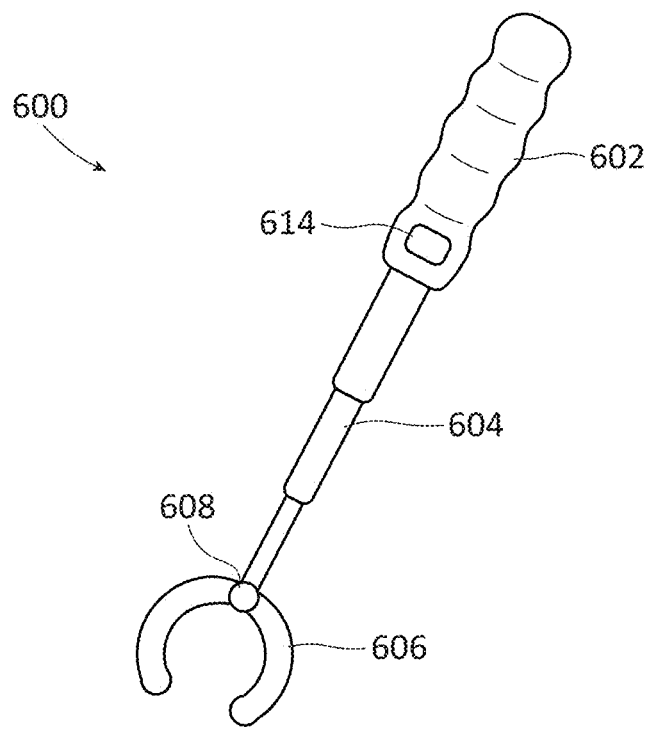
FIG. 7 is an isometric drawing of the embodiment of FIG. 6 with the extendable arm extended.

FIG. 6 is an isometric drawing of detachable shopping device 600. Device 600 includes an extendable arm 604 and a trigger 614 for clamp 606. FIG. 7 is an isometric drawing of device 600 with extendable arm 604 extended. Trigger 614 may unlock arm 604 to allow it to telescope to a desired length, or conversely may lock it in place at a desired length.

Trigger 614 may cause clamp 606 to open via hinge 608 based on force applied by the user. Then releasing trigger 614 would allow it to be biased closed (via springs, e.g.), causing gripping appendages 612 to grip a shopping cart handle 402 or shopping basket handles 306. Or, the appendages may be pulled open by the user and biased closed. These embodiments have two advantages. First, since arm 604 is extendable, device 600 is more easily used by people of varying heights and reach. Second, since clamp 606 biases appendages 612 closed, gripping appendages 612 can grip varying sizes of handles 402, 502. As an alternative, the clamp may snap on as shown in FIGS. 1 and 2.

Figure 8:
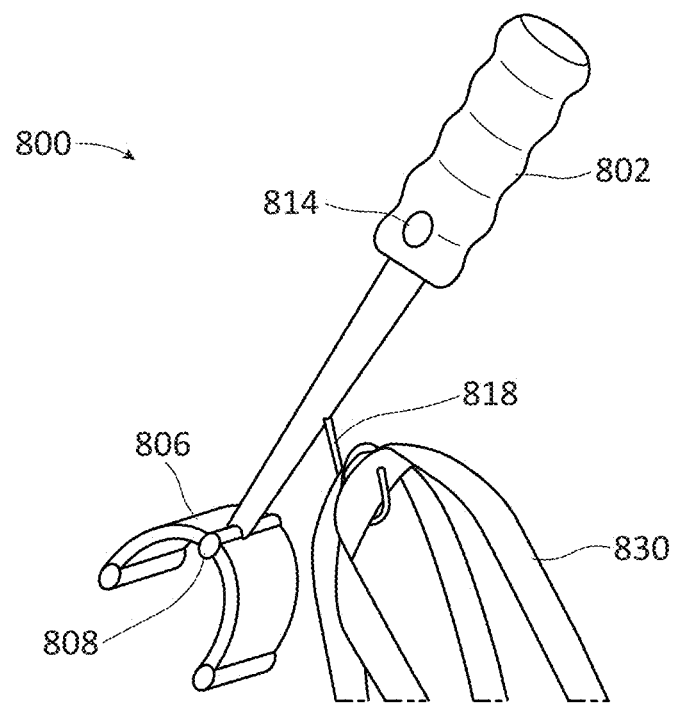
FIG. 8 is an isometric drawing of a fourth embodiment of detachable shopping handle device according to the present invention, having a shopping bag hook.

FIG. 8 is an isometric drawing of detachable shopping handle device 800, having a shopping bag hook 818 for a shopping bag 830. This embodiment includes a mechanism 814 for opening and closing clamp 806 via hinge 808. The clamp may be biased to a closed position, and the appendages opened based on force applied by the user.

Figure 9:
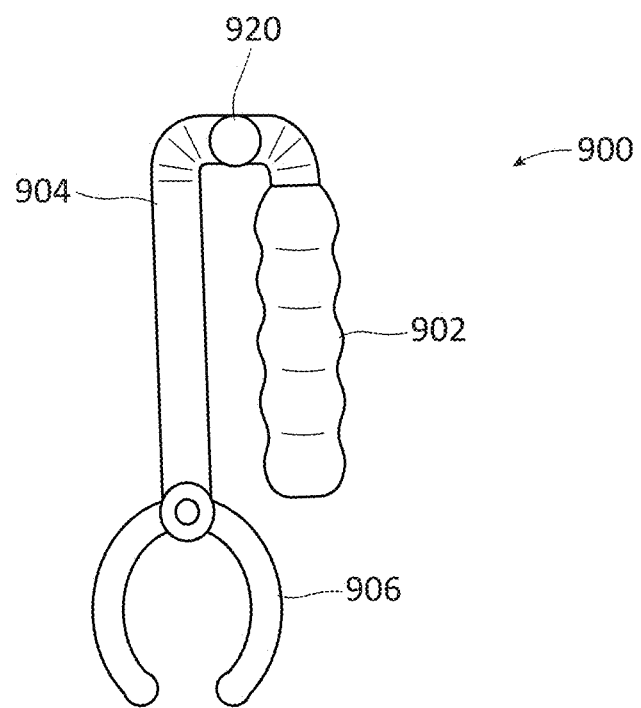
FIG. 9 is an isometric drawing of a fifth embodiment of detachable shopping handle device according to the present invention, having a foldable handle.
Figure 11A:
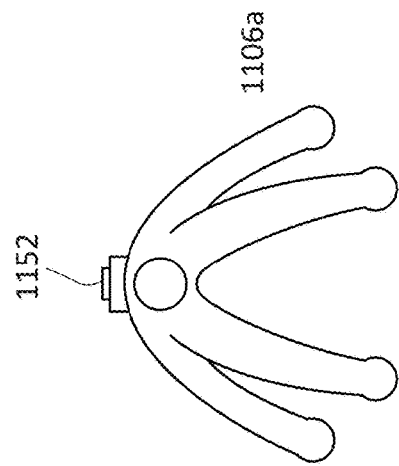
FIGS. 11A, 11B, and 11C are isometric drawings of further embodiments of detachable shopping handle devices according to the present invention, having detachable handles.
Figure 11C:
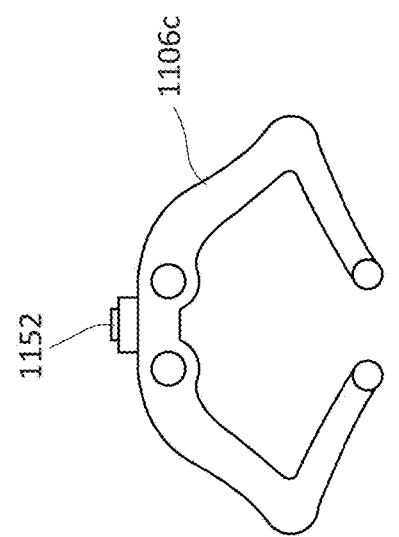

FIG. 9 is an isometric drawing detachable shopping handle device 900, having a foldable handle 904. Clamp 906 may be a snap fit as shown in FIGS. 1-5, or may be triggered to open as shown in FIG. 6-8.

Figure 10:
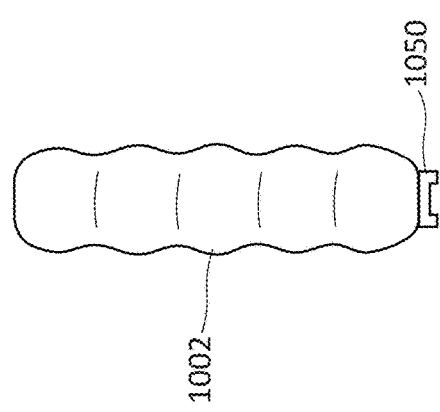
FIG. 10 is an isometric drawing of a fifth embodiment of detachable shopping handle device according to the present invention, having a detachable handle.
Figure 11B:
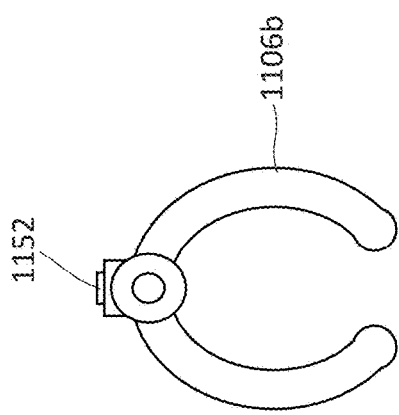

FIG. 10 shows an embodiment with a handle 1002 having a handle attachment point 1050 for attaching to a clamp 1106A, B, C. Three examples of clamp are shown, 1106A, 1106B, and 1106C. Each includes a clamp attachment point 1152 configured to attach to handle attachment point 1050.

Figure 12:
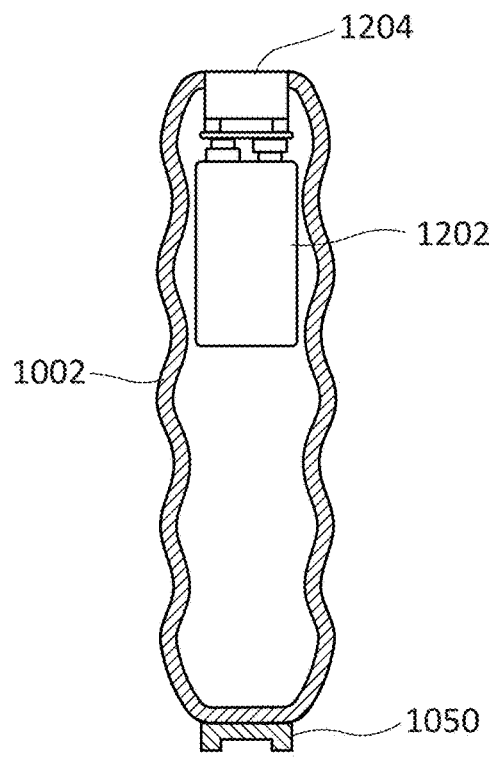
FIG. 12 is a side cutaway drawing of a handle showing a battery and connector.
Figure 13:
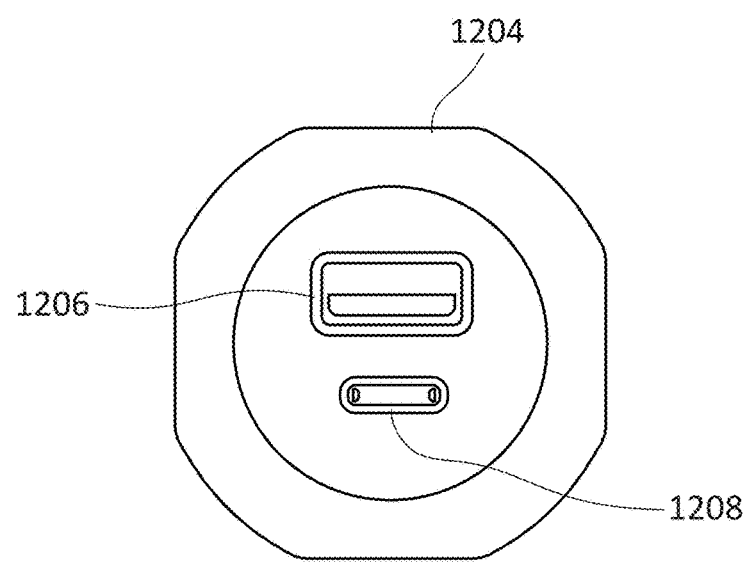
FIG. 13 is a top view of the connector of FIG. 12.

FIG. 12 is a side cutaway drawing of a handle (for example handle 1002 shown in FIG. 10) showing a battery 1202 and a connector element 1204. FIG. 13 is a top view of the connector element 1204. Battery recharging connection 1206 recharges battery 1202. An example would be a USB type A connector. Device charging connector 1208 is used to charge a phone or other device. An example would be a lightning connector or a USB type C connector. Other connectors may be used instead of—or in addition to—connectors 1206, 1208.

While the exemplary preferred embodiments of the present invention are described herein with particularity, those skilled in the art will appreciate various changes, additions, and applications other than those specifically mentioned, which are within the spirit of this invention. For example, the clamp mechanism may comprise a variety of clamp types including screw clamps, strap clamps, pivoted clamps, quick action clamps, power clamps, nonconventional clamps, trigger clamps, and the like. The features of the embodiments shown may be mixed and matched such that, for example, device 100 has an extending arm 604, a trigger mechanism 614, a foldable arm 904, or an attachment mechanism 1150, 1152.

What is claimed is:

1. A detachable shopping handle device for a shopping basket comprising two parallel shopping basket handles comprising:
    a handgrip extending in a longitudinal direction, the handgrip configured to allow a user to grip the device;
    a clamp configured to detachably snap onto the two parallel shopping basket handles, the clamp comprising two downwardly extending gripping appendages and a channel between the two gripping appendages, the channel extending parallel to the longitudinal direction and having a downwardly extending opening for insertion of the two parallel shopping basket handles; and
    an arm disposed between the handgrip and the clamp and attached to the handgrip and the clamp;
    wherein the channel simultaneously receives the two parallel shopping basket handles firmly to allow a user to lift and carry the shopping basket when the shopping basket contains groceries.

2. The detachable shopping handle device for the shopping basket comprising two parallel shopping basket handles of claim 1 wherein the clamp is sufficient to allow the user to carry the shopping basket when it contains 20 pounds of groceries.

3. The detachable shopping handle device for the shopping basket comprising two parallel shopping basket handles of claim 1 further comprising a second handgrip attached to the arm.

* * * * *